UNITED STATES PATENT OFFICE.

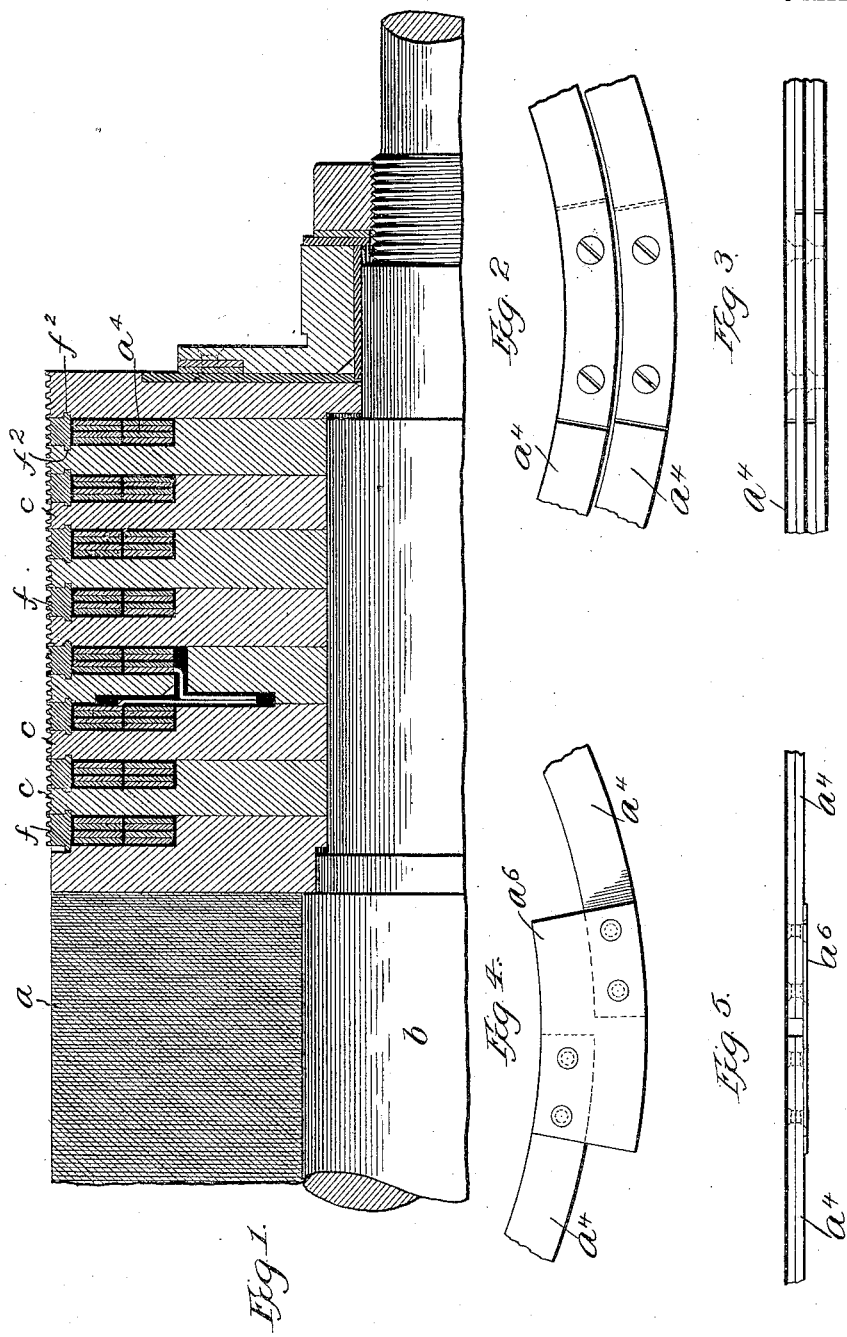

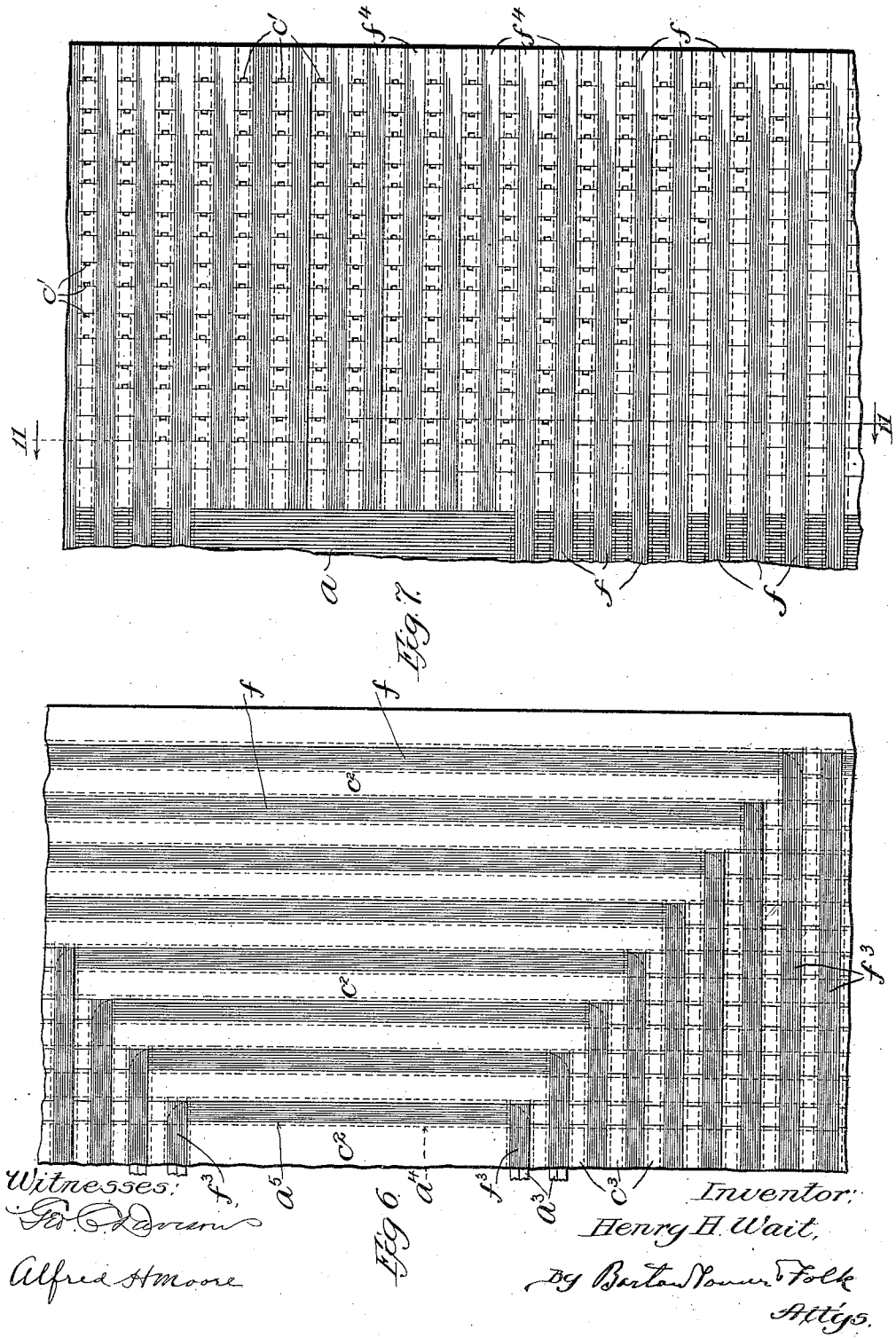

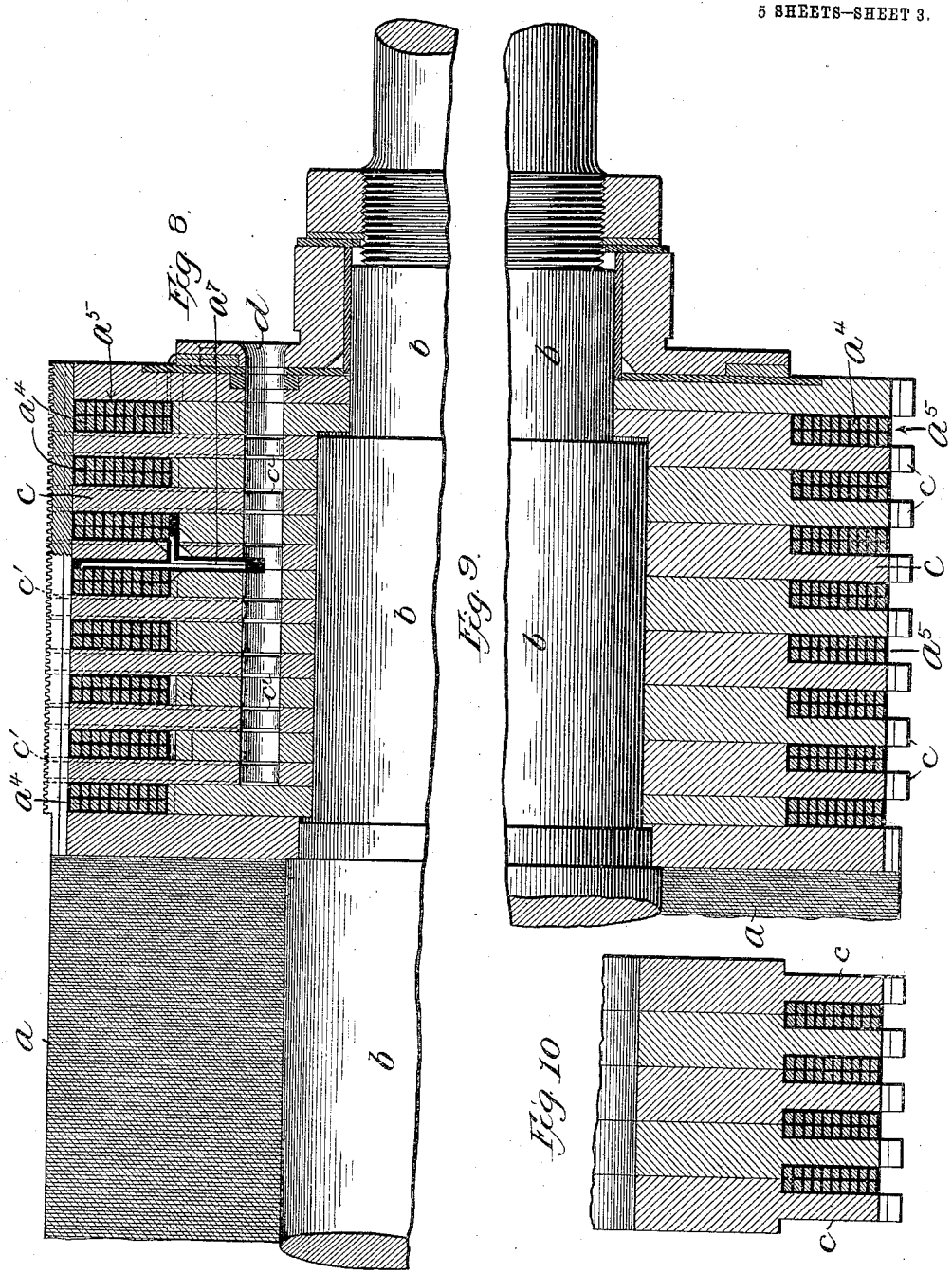

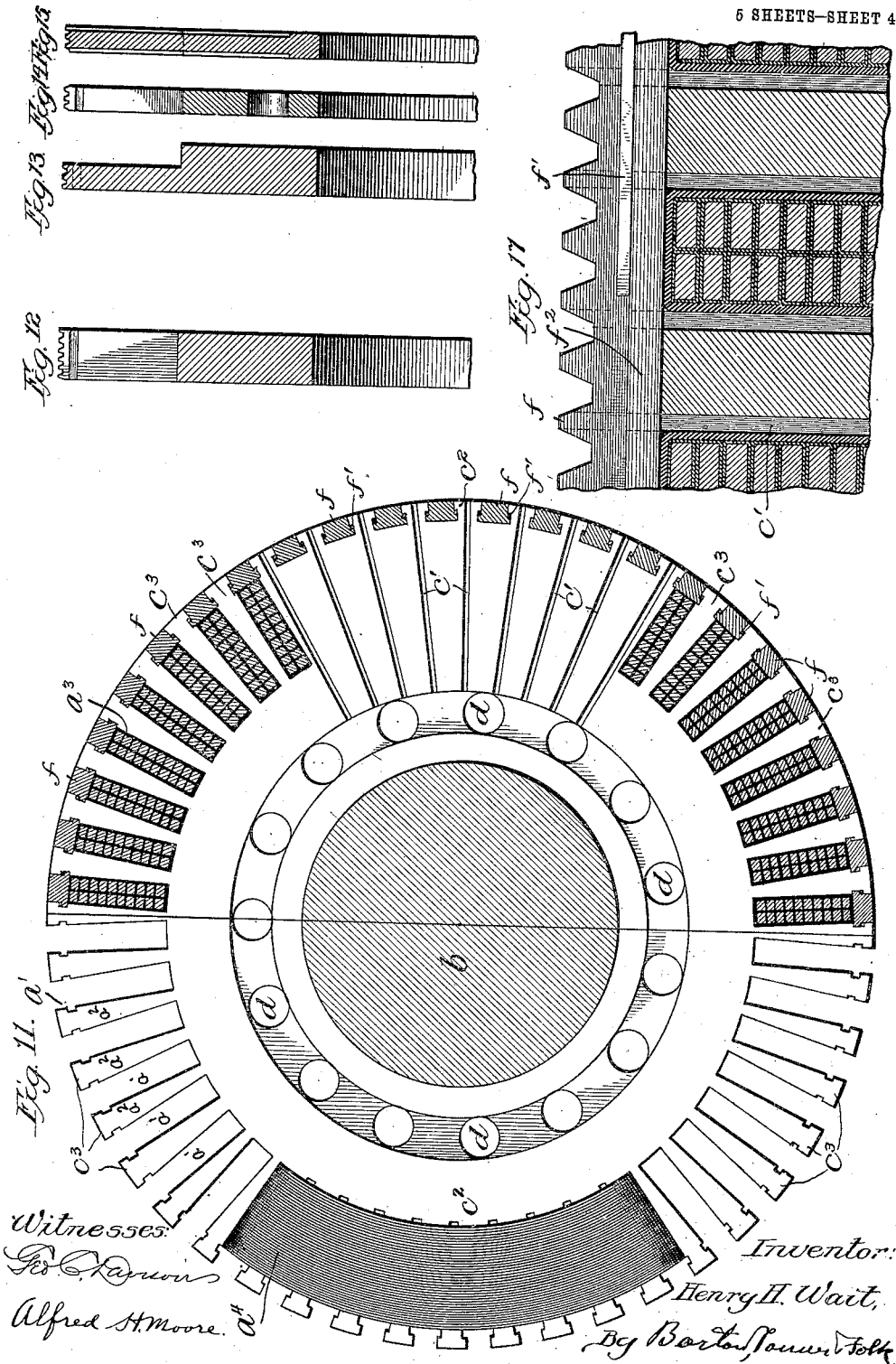

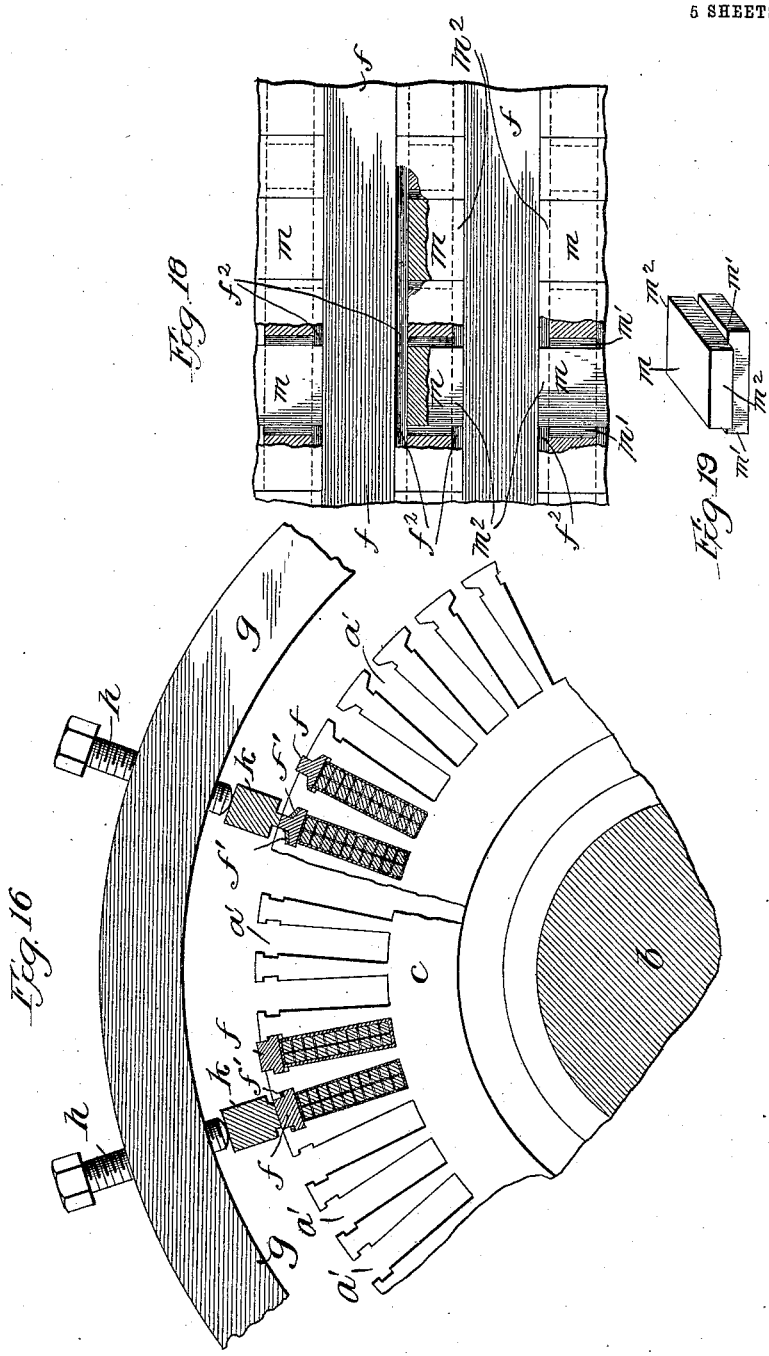

HENRY H. WAIT, OF CHICAGO, ILLINOIS.

ROTOR FOR DYNAMO-ELECTRIC MACHINES.

988,916.                    Specification of Letters Patent.          Patented Apr. 4, 1911.

Application filed January 28, 1907.   Serial No. 354,375.

*To all whom it may concern:*

Be it known that I, HENRY H. WAIT, a citizen of the United States, residing at Chicago, in the county of Cook and State of Illinois, have invented a certain new and useful Improvement in Rotors for Dynamo-Electric Machines, of which the following is a full, clear, concise, and exact description.

My invention relates to a rotor for dynamo electric machines, and more particularly to an improved construction for the rotary field magnets of alternating current generators of the high speed type. The rotors of such machines, which are intended to be direct-driven by steam turbines, are subjected to enormous centrifugal strains, and the problem of providing adequate mechanical support for the windings of such rotors, without violating the principles of good electrical design, is one presenting many difficulties, which it is the object of this invention to overcome.

In accordance with my invention, the end-connecting portions of the winding are supported by retaining members at the ends of the rotor disposed radially between the successive groups of end-connectors, said end-connectors lying in circumferential grooves or channels thus provided between said retaining members. Keys are provided which fit over the conductors in the circumferential channels, these keys interlocking with the projecting portions of the metal ribs between which said channels are formed. These keys may run either longitudinally or circumferentially of the rotor surface, as will be described. The stress due to circumferential force is thus transmitted to and sustained by the radial retaining members or plates, which carry the circumferential stress well toward the center, where the ring or hub portions are not too greatly strained by their own centrifugal force. An ironclad rotor of good electrical design and very great mechanical strength is thus secured.

My invention will be explained in detail, and further features thereof will be particularly pointed out, by reference to the accompanying drawing, in which, Figure 1 is a longitudinal sectional view of a portion of the end of a rotary field magnet for a turbo-alternator; Figs. 2 and 3 are details illustrating the manner in which the end connecting portions of the copper conductors may be spliced together; Figs. 4 and 5 are similar details illustrating how a conductor at the bottom of one of the channels may be electrically connected to another conductor at the top of the channel; Fig. 6 is a detail view of a portion of the surface at the end of the rotor, developed into a plane, to show the disposition of the conductors and the keys for holding them in their slots or channels; Fig. 7 is a view similar to Fig. 6, but showing a modified construction in which the keys for holding the end-connecting portions of the conductors run longitudinally of the rotor, crossing all of the end-connections; Fig. 8 is a longitudinal sectional view of a portion of the end of the rotor constructed upon the modified plan shown in Fig. 7; Figs. 9 and 10 are similar views showing different constructions of the end plates or disks in which the circumferential channels for the end connections are provided; Fig. 11 is a cross sectional view of the form of the rotor illustrated in Figs. 7 and 8, the section being taken on the staggered line 11—11 of Fig. 7; Figs. 12, 13, 14 and 15 show plates of various forms; Fig. 16 illustrates a means for forcing the keys or wedges down in the slots and compressing the conductors underneath as much as possible, leaving room for the insertion of supplemental wedges above the shoulders of the keys to hold said keys in their depressed position; Fig. 17 is a longitudinal sectional view of a portion of the surface showing one of the longitudinal keys and the supplemental key in connection therewith; Fig. 18 is a portion of the surface of the rotor shown in Figs. 7, 8 and 11, with parts broken away to illustrate the application of certain filler-blocks which are intended to be inserted in the channels between the different keys; and Fig. 19 is a detail view of one of these filler-blocks.

The same letters of reference indicate the same parts wherever they are shown.

Referring first to Figs. 1 and 6, the rotor comprises a core $a$ of the usual laminated construction, the core disks being assembled upon a shaft $b$. The core is provided with longitudinal channels $a^1$ at its periphery, these channels being shown as grooves or slots open at the top and separated by intervening teeth $a^2$ as shown in Figs. 6 and 11. The conductors of the winding are disposed in these longitudinal grooves. The active portions $a^3$ of the winding in the longitudinal grooves are united at the ends by end-connecting portions $a^4$, which, in accordance with my invention, are disposed in transverse channels or grooves $a^5$ extending circumferentially about the periphery of the rotor near the ends thereof and uniting the longitudinal channels in pairs. The circumferential transverse channels which receive the end-connecting portions of the winding are separated by transverse metal ribs $c$, which may be and preferably are disks or plates assembled upon the shaft at the end of the rotor, these plates being disposed alternately between the end-connections and projecting radially beyond the outer surface of said end-connections. Metal keys $f$ are provided which interlock with the projecting portions of the ribs or plates between the end-connections, these keys overlying said connecting portions $a^4$ of the winding and serving to retain them in place against centrifugal force. As shown in Figs. 1 and 6, the inner sides of the circumferential connecting grooves are undercut to receive the shouldered portions $f^2$ of the circumferential keys. The longitudinal grooves in the core receiving the active portions of the winding are also filled at the top by longitudinal keys $f^3$ sliding into undercut grooves near the tops of these channels. The peripheries of the keys and disks at the ends of the rotor are preferably grooved circumferentially at the outer edge to increase the heat radiating surface; and I may also provide radiating ventilating channels $c^1$ $c^1$ communicating with the interior longitudinal ventilating bore $d$, as shown in Fig. 8.

The circumferential channels for the end-connections are formed by spaces between the circular plates $c$. Various forms of these plates are shown in the drawings. In general, each plate will have a large tooth or lug $c^2$ (Figs. 6 and 11) extending over a considerable arc of its circumference from the mouth of a longitudinal channel on one side of the rotor to the mouth of the corresponding channel symmetrically located on the other side of the rotor; and each plate will further have smaller individual teeth $c^3$ projecting between the longitudinal portions of those turns of the winding which lie outside those immediately embracing the large lug. The first few retaining plates lying nearest the core could be made of magnetic material, such as steel, in which case they will augment the magnetic carrying capacity of the core, but will also increase the leakage. I prefer, therefore, to make only one or two of these plates of magnetic material. All the retaining plates may, however, be made of strong bronze, or of a non-magnetic steel.

In Figs. 7, 8 and 18, and in other figures, I have indicated a modified construction in which the keys $f$ for holding the end-connecting portions of the windings extend longitudinally of the rotor, parallel with its axis, instead of circumferentially, as in Figs. 1 and 6. These longitudinal keys may therefore be merely extensions of the keys in the longitudinal slots. The circumferential end-connecting portions of the winding are held in place by the longitudinal keys which cross above them. The portion of the core surface forming the pole piece is preferably not slotted; but the retaining plates at the ends of the core may be slotted and provided with shorter longitudinal keys $f^4$ $f^4$ extending across the series of retaining plates up to the end of the laminated iron core.

The winding of the rotor may be composed of many turns or of few turns as desired. In Fig. 8, and in other figures, there are twenty conductors in each slot, connected in series, while in Fig. 1 there are in effect four heavy conductors in each slot, connected in series. As a matter of fact, in Fig. 1 each of the four insulated conductors in the slot is composed of two copper bars arranged side by side, in contact. These copper bars are wide and comparatively thin, and are arranged on edge in the slot, the slot being deep enough to accommodate two layers of such conductors, one above the other. The end-connections between such conductors $a^4$ may be made as indicated in Figs. 2, 3, 4 and 5. The ends of the inner conducting bars embedded on edge in the longitudinal channels are bent to lie circumferentially in the connecting channels at the ends of the rotor, and connection is made between different bars by bringing their flat sides together to form a lap joint, as indicated in Figs. 2 and 3, the joint being preferably screwed or riveted together and soldered. Where the end of a conductor bar at the top of one slot is to be connected to a bar in a lower layer of the same slot, this may be accomplished, as shown in Figs. 4 and 5, by bringing the flat sides of the bar into contact with a thin flat plate $a^6$ wide enough to span them both, the parts being made fast by solder and rivets. In Fig. 8 I have shown the top conductor in one slot and the bottom conductor in the next slot connected by copper strips $a^7$ which extend into a radial recess and are soldered together. Where the winding is to be made of many turns of comparatively small cross section, the conductors may be simply laid in the continuous channels and worked into place.

In Fig. 16 I have indicated a means for compressing the windings more closely in the slots. After the coils are wound in place a heavy ring $g$ carrying radial set screws $h$ $h$ may be placed about the rotor and the set screws may then be tightened against blocks $k$ $k$ lying over the wedge keys. If these keys are made in reasonably short sections, small supplemental keys $f^1 f^1$ can be driven into place above the shoulders of the main keys so as to occupy the space left when the main keys are depressed. In Fig. 17 I have indicated one of the supplemental keys lying above the shoulder $f^2$ of the main key. Different shapes of keys are shown in Fig. 16.

It will be evident that in the construction shown in Figs. 7 and 8, where the retaining keys all run longitudinally, the portions of the circumferential slots lying between the longitudinal ribs, will be uncovered. In Figs. 18 and 19 I have illustrated a means for covering these intermediate portions of the circumferential slots by means of filler-blocks $m$, such as shown in Fig. 19. These filler-blocks will be provided with projecting ribs or shoulders $m^1$ adapted to interlock with undercut grooves in the projecting portions of the plates on either side of the slots, and they also have shoulders $m^2$ adapted to overlie the longitudinal keys and assist in holding said keys in place.

It will be observed that in the rotor of my invention the end-connecting portions $a^4$ of the winding are held against centrifugal force by retaining members such as disks or plates $c\ c$ which extend radially inward well toward the center. The centrifugal tension is therefore transmitted radially and sustained by material near the center which is not so greatly strained by its own centrifugal force as a mere band encircling the outside of the rotor would be.

I claim:

1. A rotor having a series of longitudinal channels and circumferential transverse connecting grooves in its periphery, a winding having its active and inactive portions embedded in said channels and grooves, respectively, longitudinal keys overlying said longitudinal channels, and circumferential keys overlying said transverse grooves, whereby said keys retain said conductors in place against centrifugal force.

2. A rotor having a series of longitudinal channels and circumferential transverse connecting-grooves in its periphery, the active and end-connecting portions of a winding being embedded in said channels and grooves, and circumferential keys in the transverse grooves overlying the conductors therein and interlocking with the sides of said grooves to retain said conductors in place against centrifugal force.

3. A rotor having longitudinal channels in its periphery, a winding embedded in said channels, retaining plates at the end of the rotor extending radially between the end and connecting portions of said winding and providing circumferential channels to receive and hold said end connections, and circumferential retaining members overlying said circumferential channels to retain said end connections in place against centrifugal force.

4. A rotor having narrow conductor bars embedded on edge in longitudinal channels, said channels being of a depth to receive two or more layers of said conductor-bars, transverse disks at the ends of the rotor, with circumferential channels between said disks in which the ends of said bars are bent to lie, connections being made between a bar in an upper layer and one in a lower layer by means of a flat plate transverse to the axis of the rotor to which the flat sides of said upper and lower bars are secured.

5. In a rotor for electric machines, the combination with a core having longitudinal channels, a winding in said channels, end connections for said winding, retaining plates lying between the end-connections of the windings, and keys for interlocking said plates and windings, the peripheral surface of said plates and keys being grooved, whereby the radiating surface is increased.

In witness whereof, I hereunto subscribe my name this twenty sixth day of January A. D., 1907.

HENRY H. WAIT.

Witnesses:
GEORGE V. BARTON,
GEORGE E. FOLK.

---

Copies of this patent may be obtained for five cents each, by addressing the "Commissioner of Patents, Washington, D. C."